United States Patent [19]
Meyer et al.

[11] Patent Number: 5,889,975
[45] Date of Patent: Mar. 30, 1999

[54] METHOD AND APPARATUS PERMITTING THE USE OF A PIPE STAGE HAVING AN UNKNOWN DEPTH WITH A SINGLE MICROPROCESSOR CORE

[75] Inventors: Paul G. Meyer; Stephen Strazdus; Dennis O'Connor, all of Chandler; Thomas Adelmeyer, Phoenix; Jay Heeb, Gilbert; Avery Topps, Phoenix, all of Ariz.

[73] Assignee: Intel Corporation, Santa Clara, Calif.

[21] Appl. No.: 746,285

[22] Filed: Nov. 7, 1996

[51] Int. Cl.⁶ ........................................................ G06F 9/38
[52] U.S. Cl. .............................................. 395/395; 395/381
[58] Field of Search ..................................... 395/381, 383, 395/390, 392, 393, 395, 800.23

[56] References Cited

U.S. PATENT DOCUMENTS

| | | | |
|---|---|---|---|
| 5,019,967 | 5/1991 | Wheeler et al. | 395/395 |
| 5,187,800 | 2/1993 | Sutherland | 395/800.18 |
| 5,487,156 | 1/1996 | Popescu et al. | 395/393 |
| 5,490,255 | 2/1996 | Rawlinson et al. | 395/395 |
| 5,559,975 | 9/1996 | Christie et al. | 395/571 |
| 5,564,029 | 10/1996 | Ueda et al. | 395/392 |
| 5,634,136 | 5/1997 | Ohshima et al. | 395/584 |
| 5,666,507 | 9/1997 | Flora | 395/394 |
| 5,668,984 | 9/1997 | Taborn et al. | 395/563 |

Primary Examiner—Parshotam S. Lall
Assistant Examiner—Viet Vu
Attorney, Agent, or Firm—Blakely, Sokoloff, Taylor & Zafman LLP

[57] ABSTRACT

A processor core suitable for use with a wide variety of instruction fetch units. The processor core contains a plurality of pipe stages including an instruction pointer generation stage and a decode stage. The core bundles all control necessary for downstream pipeline operation with an instruction address in a first stage. The bundle is transmitted outside the core to the instruction fetch unit. The instruction fetch unit fetches the instruction and adds it to the bundle, before forwarding the bundle as modified back within the core and down the pipeline. In this way, an external pipe stage is introduced providing a connection between discontinuous pipe stages in the core. Additionally, by bundling the control signals and address information in a single bundle that traverses the external pipe stage as a group, synchronization concerns are reduced or eliminated.

14 Claims, 6 Drawing Sheets

| IP  | I1 | I2 | I3 | -- | -- | -- | -- |
|-----|----|----|----|----|----|----|----|
| IFU | -- | I1 | I2 | I3 | -- | -- | -- |
| ID  | -- | -- | I1 | I2 | I3 | -- | -- |
| EX  | -- | -- | -- | I1 | I2 | I3 | -- |
| WB  | -- | -- | -- | -- | I1 | I2 | I3 |

*Figure 4a*

| IP  | I1 | I2 | I3 | -- | -- | -- | -- | -- |
|-----|----|----|----|----|----|----|----|----|
| IFU | -- | -- | I1 | I2 | I3 | -- | -- | -- |
| ID  | -- | -- | -- | I1 | I2 | I3 | -- | -- |
| EX  | -- | -- | -- | -- | I1 | I2 | I3 | -- |
| WB  | -- | -- | -- | -- | -- | I1 | I2 | I3 |

*Figure 4b*

| IP  | I1 | I2 | I3 | -- | -- | -- | -- | -- | -- |
|-----|----|----|----|----|----|----|----|----|----|
| IFU | -- | -- | -- | I1 | I2 | I3 | -- | -- | -- |
| ID  | -- | -- | -- | -- | I1 | I2 | I3 | -- | -- |
| EX  | -- | -- | -- | -- | -- | I1 | I2 | I3 | -- |
| WB  | -- | -- | -- | -- | -- | -- | I1 | I2 | I3 |

*Figure 4c*

|      | T=1 | T=2 | T=3 | T=4 | T=5 | T=6   | T=7   | T=8   | T=9 |
|------|-----|-----|-----|-----|-----|-------|-------|-------|-----|
| IP   | I1  | I2  | I3  | I4  | I5  | I6    | I6    | I6    | I7  |
| IPL  | --  | I1  | I2  | I3  | I4  | I5    | --    | --    | I6  |
| FU1  | --  | I1  | I2  | I3  | I4  | I5    | --    | --    | I6  |
| CL   | --  | --  | I1  | I2  | I3  | I4    | I5    | --    | --  |
| FU2  | --  | --  | I1  | I2  | I3  | I4    | I5    | --    | --  |
| Q    | --  | --  | --  | --  | I2  | I2,I3 | I3,I4 | I4,I5 | I5  |
| IFL  | --  | --  | --  | I1  | I1  | I1    | I2    | I3    | I4  |
| ID   | --  | --  | --  | I1  | I1  | I1    | I2    | I3    | I4  |

METHOD AND APPARATUS PERMITTING THE USE OF A PIPE STAGE HAVING AN UNKNOWN DEPTH WITH A SINGLE MICROPROCESSOR CORE

BACKGROUND OF THE INVENTION (1) Field of the Invention

The invention relates to a pipelined processor core. More specifically, the invention relates to a versatile processor core which allows use of varied instruction fetch units without modification to the core.

(2) Related Art

Pipelined processing is generally well-known in the art. FIG. 1 shows one such typical pipelined processor. The processor core 1 includes five pipe stages 2–6. Between each stage is an implicit latch (not shown). The information is latched from one pipe stage to the next under the control of the pipe sequencer 7. The first pipe stage is an instruction pointer generator stage (IP) 2 which generates an address at which the desired instruction can be found. This address is then latched to the instruction fetch unit stage (IFU) 3 which physically fetches the instruction. Typically, the IFU has on-board memory of some kind. The on-board memory may be of the form of an instruction cache or it might be read only memory (ROM). The IFU is also coupled to the bus controller 8 which allows the IFU to access the memory 10 in the event that the desired instruction is not found in the on-board memory.

Once the instruction is retrieved either from the on-board memory or externally, the instruction is lathed to a third pipe stage instruction decode unit/register file stage (ID) 4. The ID 4 decodes the instruction and acquires any required operands from a register file. Where each pipe stage tables a single cycle, the ID expects that an instruction will arrive in the third cycle and each cycle thereafter. If the IFU 3 cannot deliver an instruction to the ID 4, it notifies the pipe sequencer 7 that it is stalled while it obtains the expected instruction. The pipe sequencer stalls all stages above. Once the instruction is delivered and decoded, the instruction and operands are then latched to the next stage, the execution unit 5 for execution of the instruction. The final pipe stage is write-back stage 6 in which results of the instruction executed in the execution unit 5 during the previous cycle are written back to the register file or the data cache 9. Branch target path 11 allows the execution unit 5 to inform the IP 2 that a branch has occurred, and provide an address at which execution should continue. In response, the information currently in the pipeline relating to instruction after the branch in the instruction stream is flushed. The pipe sequencer 7 handles common control amongst the pipe stages and insures synchronization. It is critical that the pipe sequencer knows what is occurring in the stages it controls so that synchronization is maintained and retries can be generated when expected data is not received at any particular stage.

In the event of a stall, the stage initiating the stall notifies the pipe sequencer 7, and the pipe sequencer 7 stalls all units above that stage in the same cycle. For example, if the ID 4 is unable to complete decode and register retrieval in the allotted cycle, it issues a stall instruction to the pipe sequencer 7 which immediately stalls the IP 2 and the IFU 3. This stall must be completed within the cycle or, for example, a fetched instruction will be latched to the ID 4 with a new instruction taking its place in the latch. If the ID 4 is unable to accept the instruction latched to it, that instruction is lost. The stall becomes a critical speed path which reduces the maximum frequency at which the core 1 can operate, because the ID may not identify that it does not have, e.g., a needed operand until late in the cycle and because of the number of latches required to be stalled requires time to buffer up of the stall signal to a level able to stall all stages above the stage initiating the stall.

FIG. 2 shows a block diagram of a system of an alternative pipelined processor from the prior art. Processor core 30 contains a plurality of pipe stages. Instruction pointer generation stage (IP) 32 generates an instruction pointer and control information which it places in an instruction pointer latch (IPL) 33. From IPL 33, a plurality of signals including control information and an instruction address are latched into dummy stage 38 which must be the same depth as an instruction fetch unit stage (IFU) 39 which resides outside the core boundary 31. Simultaneously with the latching of the control signals and the instruction address into the control stage 38, the instruction address is latched out on line 43 to IFU 39. IFU 39 fetches the instructions specified by the address and provides it to instruction fetch latch (IFL) 34 inside the core 30. Simultaneously, the control and instruction address arrive from the dummy pipe stage 38. Control information, instruction address, and the instruction are then latched in the instruction decode/register file stage (ID) 35. The instruction is decoded in the ID 35 and the operands retrieved. The decoded instruction and operands as well as control information are latched to execution unit 36. The information necessary for write-back is latched to the write-back stage 37 as in the prior art The latches between the ID 35 and the execution unit 36 and between the execution unit 36 and the write-back 37 unit, are not shown for clarity in the drawing. Restart line 38 is used to inform the IP 32 of the new address and to invalidate the data currently in the pipe when a branch is mispredicted. The execution unit 36 will ignore all data received until it receives the restart signal propagated through with an instruction corresponding to the branch result.

In the event of a stall, for example, in the ID 35, signal line 40 is asserted to stall IFL 34 and is propagated up to also stall IPL 33. If dummy stage 38 and IFU 39 have depths of greater than one, stall signal 40 must be propagated to dummy stage 38 and IFU 39 as well. An analogous situation arises for stalls originating lower in the pipeline. As mentioned before, this results in a critical timing path necessary for buffering up and propagating the signal to achieve the stall without loss of data. Additionally, while IFU 39 is made flexible in terms of the size of memory it may have on board, its depth is dictated by the dummy stage 38 as the two must be of equal depth in order to ensure proper synchronization of the control signals propagating down within the core 30.

Changes in application or desired use commonly necessitate a redesign of the core. Commonly, this is a result of change to the IFU. Among the things that may change as a result of cost or space concerns are size of the on-board memory and the depth of the IFU pipeline. For example, in some applications, it is desirable for cost or design time reasons to use an IFU which requires more than a single cycle to retrieve an instruction. The IFUs are circuit intensive, and the more rigorous the timing requirements for instruction retrieval, the greater the cost and design effort required to insure compliance with that timing. Thus, by expanding the timing allowed, the IFU can be designed using less senior designers and at a lower cost. While moving the IFU 39 outside the core as shown in FIG. 2 allows the size to be changed. Without core redesign, it does nothing to address changes in the depth of the IFU pipeline.

In view of the foregoing, it would be desirable to have a core suitable for use at the large variety of products and flexibly able to incorporate IFUs of varying sizes and depths without necessitating a redesign of the core.

BRIEF SUMMARY OF THE INVENTION

A processor core suitable for use with a wide variety of instruction fetch units is disclosed. The processor core contains a plurality of pipe stages including an instruction pointer generation stage and a decode stage. The core bundles all control necessary for downstream pipeline operation with an instruction address in a first stage. The bundle is transmitted outside the core to the instruction fetch unit. The instruction fetch unit fetches the instruction and adds it to the bundle, before forwarding the bundle as modified back within the core and down the pipeline. In this way, an external pipe stage is introduced providing a connection between discontinuous pipe stages in the core. Additionally, by bundling the control signals and address information in a single bundle that traverses the external pipe stage as a group, synchronization concerns are reduced or eliminated.

BRIEF DESCRIPTION OF THE DRAWINGS

FIGS. 4a–c show instruction timing in a pipeline of the invention in which an instruction fetch unit has a depth of 1, 2, and 3 cycles, respectively.

FIG. 6 shows instruction timing in the instruction fetch unit of FIG. 5 under certain stall conditions.

DETAILED DESCRIPTION OF THE INVENTION

Figure 1:
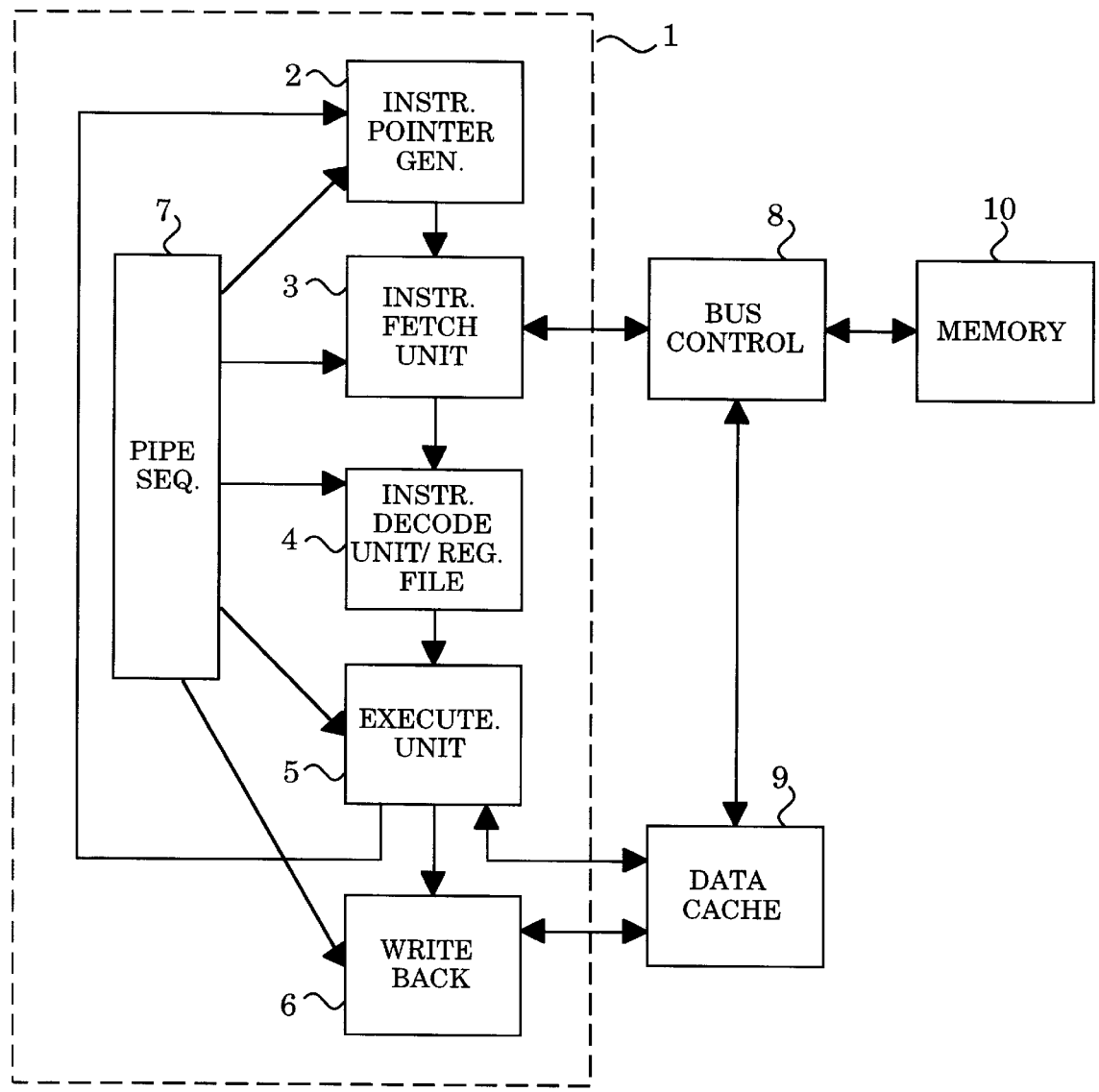
FIG. 1 shows a block diagram of a prior art pipelined processor system.
Figure 2:
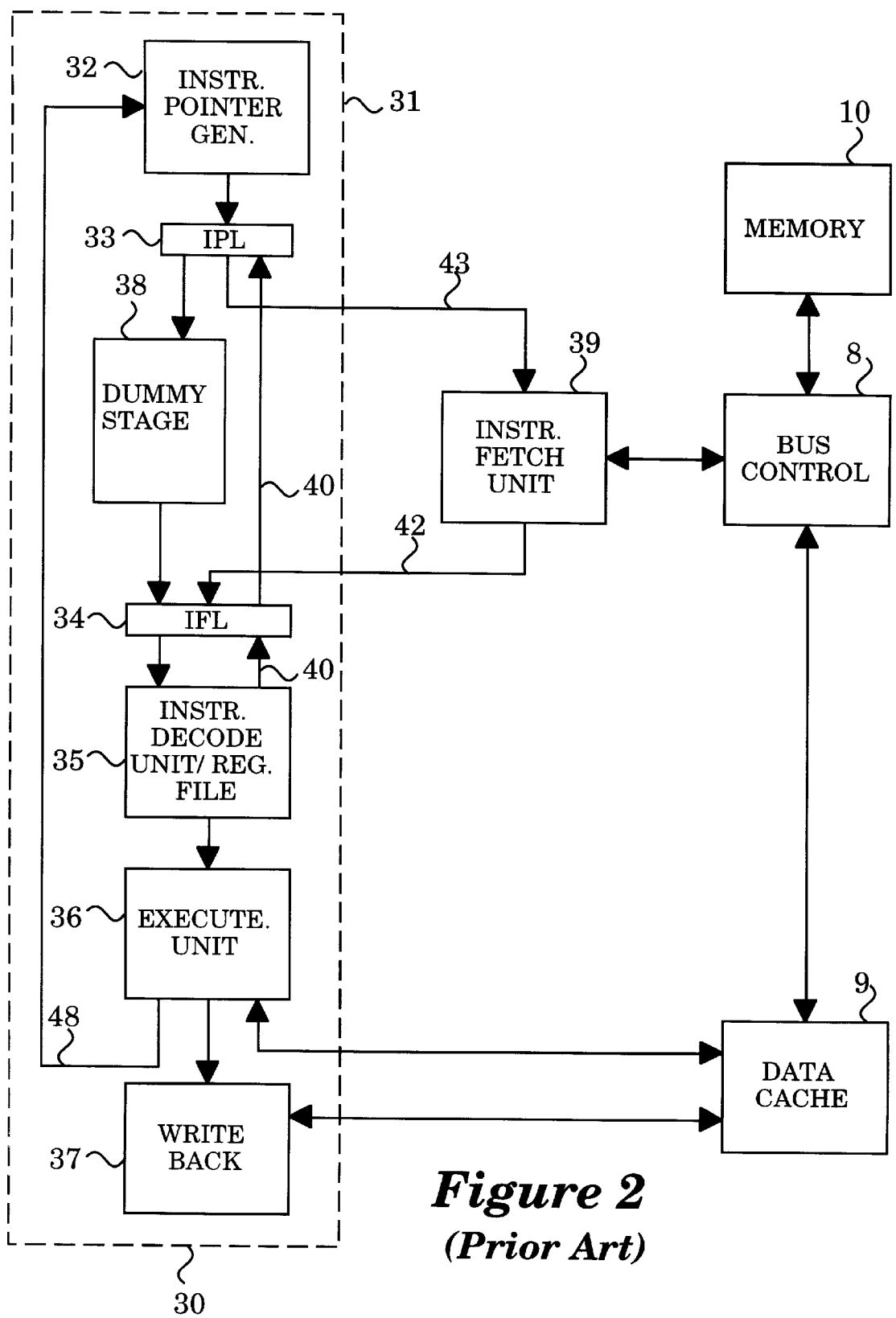
FIG. 2 shows a block diagram of an alternate prior art pipelined processor system.
Figure 3:
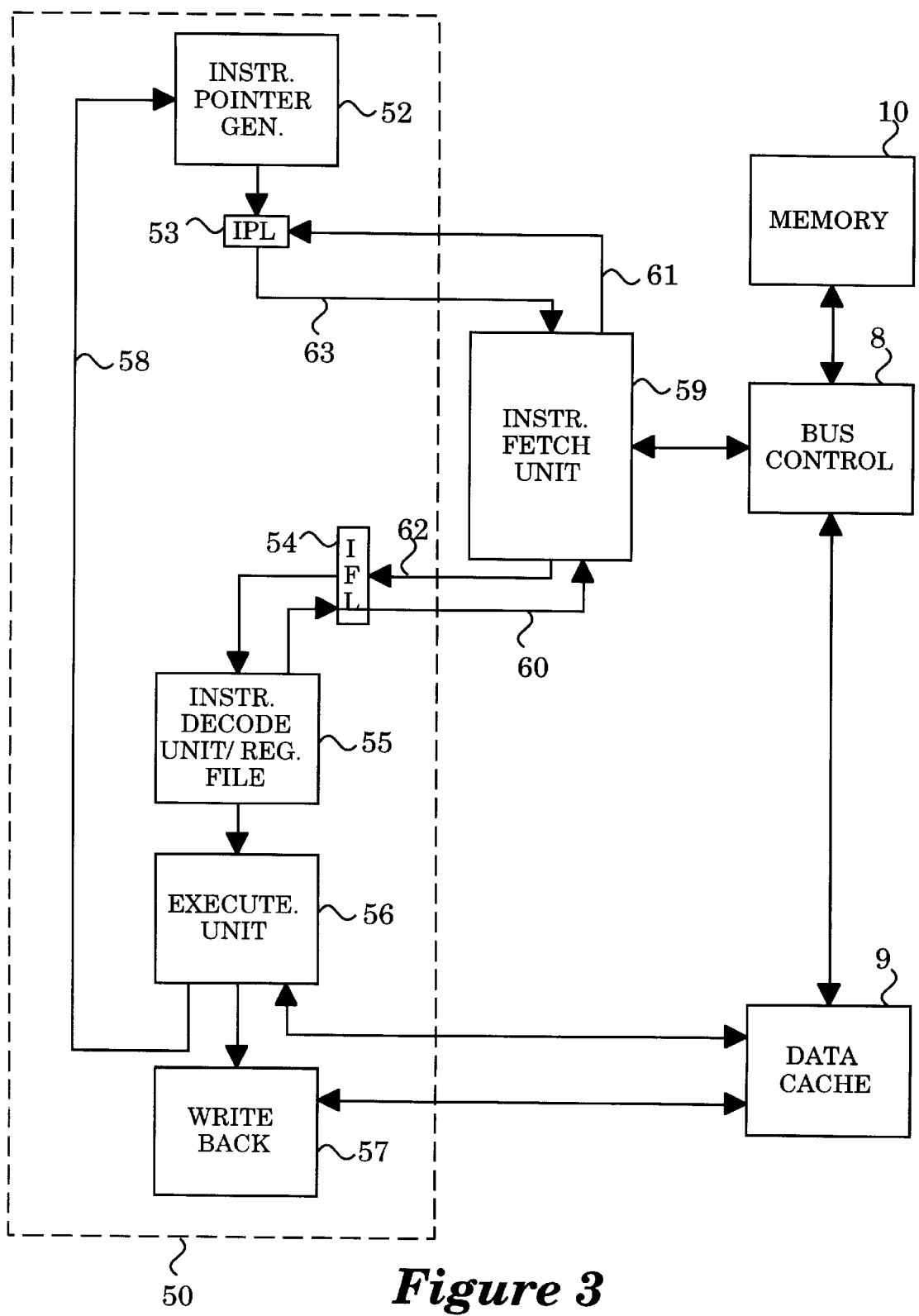
FIG. 3 shows a block diagram of a preferred embodiment of the invention.

FIG. 3 shows a system using a preferred embodiment of the invention. The pipeline has five stages: an instruction pointer generation stage (IP) 52, an IFU stage 59, an instruction decoder/register file stage (ID) 55, an execution unit stage 56, and a write-back stage 57. All these stages except the IFU 59 are within the processor core 50. IFU 59 is across the core boundary 51, and subject to certain interface requirements, can vary widely in design and particularly in size and depth. In this embodiment, the actions of the IFU 59 are transparent to the core 50. IFU 59 must accept an address pointer and control information from the IP and return the instructions and control information to the ID 55, but what the IFU 57 does between accepting and returning such signals is independent of the core design.

The IP 52 generates an address to a desired instruction. The IP places this address and all control information needed for downstream pipe stages in instruction pointer latch (IPL) 53 as a bundle. The bundle of information including both the instruction address and all control information is transmitted along signal lines 63 across the core boundary 51 to IFU 59. The IFU 59 must retain the bundle so it can be forwarded down the pipe with the fetched instruction. Accordingly, the IFU 59 appends the bundle to include the fetched instruction and forwards the appended bundle on lines 62 to instruction fetch latch (IFL) 54. The appended bundle is then latched into the ID 55. The function of ID 55, execution unit 56 and the write-back stage 57 are similar to the prior art. However, as there is no pipe sequencer, control is distributed and based on the control signals transmitted through the pipe as part of the bundle. Moreover, as there is no certainty that the IFU should deliver the instruction corresponding to an issued pointer one cycle later, the ID does not expect such deliveries and has no facility to have the IP reissue an address.

Additionally, in the event of a stall in the ID 55 (or lower in the pipeline), the ID 55 stalls the IFL 54 and provides stall signal 60 at the core boundary 51. What the IF 59 does with stall signal 60 will be implementation specific and independent of the stages below it in the pipeline. This is discussed further below in connection with FIGS. 5 and 6. Restart signal line 58 notifies the IP 32 of a branch target in case of a mispredicted branch. A restart signal is asserted in the next bundle which also includes the branch target address. When the IFU receives the restart depending on its implementation, it may be able to avoid unnecessary fetches by canceling anything in progress. This is particularly beneficial when the downstream fetches are to main memory 10.

Because the ID 55 and IP 52 have been decoupled and all control information propagates through the IFU 59, synchronization concerns attributable to a variable depth IFU are obviated. Moreover, the described core 50 will function properly with any of a wide variety of sizes and depths of IFUs without any redesign of the core 50.

FIGS. 4a–c show instructions passing through the pipe of the invention in which the IFU is 1, 2, and 3 cycles deep, respectively. In FIG. 4a, the IP issues a first instruction in a first cycle, and the IFU issues that instruction in the next cycle, and so forth through the pipe. In FIG. 4b, the IP issues a first instruction in the first cycle, a second instruction in the second cycle, and a third instruction in the third cycle. However, the IFU does not issue the first instruction until the third cycle. Thus, at start-up, there are two cycles of latency before the IFU begins issuing an instruction every cycle. FIG. 4c shows an analogous case in which three cycles of latency occur before the IFU begins issuing an instruction every cycle. FIGS. 4b and 4c presume that the IFU has a depth of two and three, respectively, and that it is pipelined. However, the invention would also function with a non-pipelined IFU having arbitrary depth. This would, of course, degrade performance as there would be a delay of the IFU depth between each instruction issued from the IFU. Nevertheless, it is within the scope and contemplation of the invention.

Figure 5:
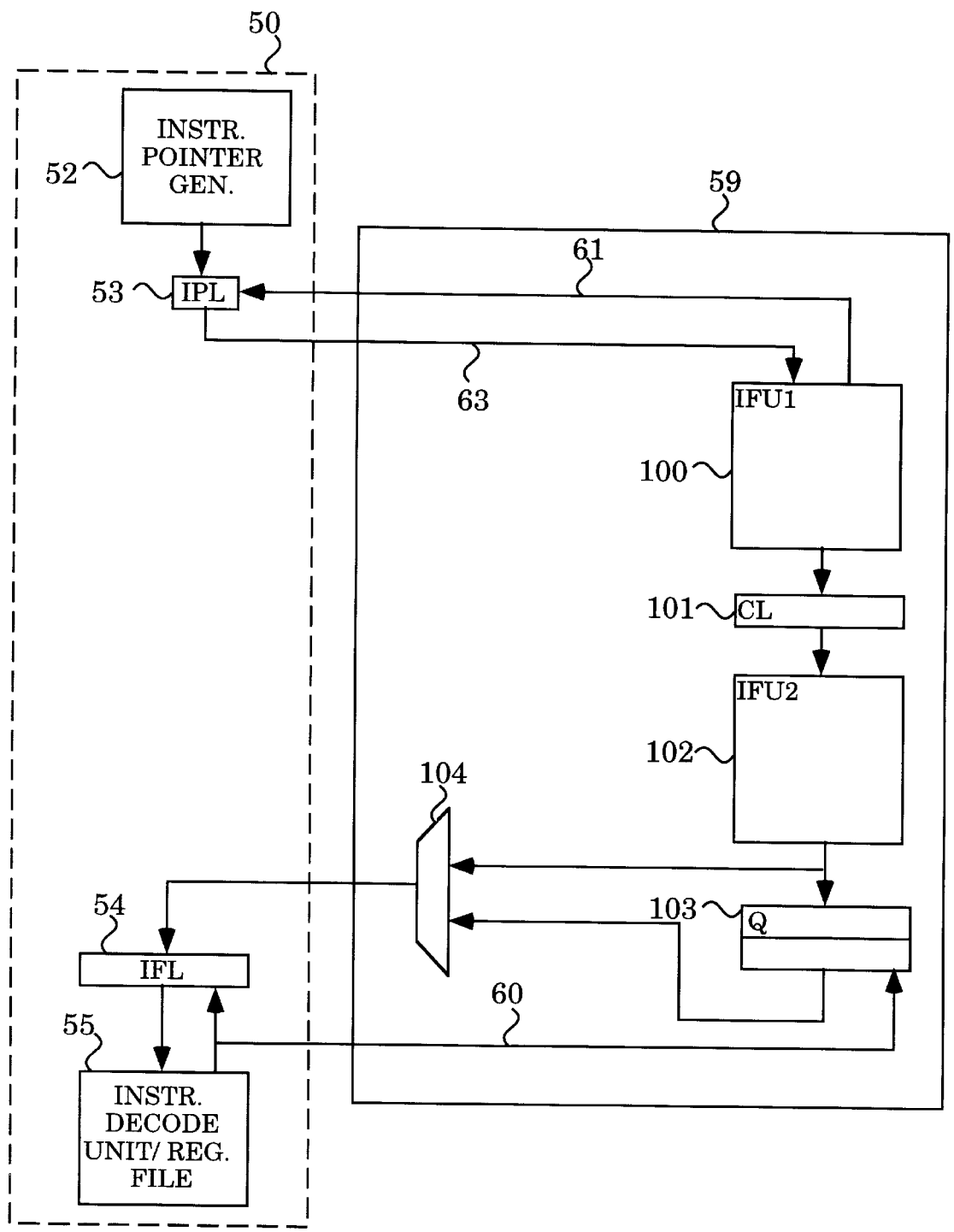
FIG. 5 shows a block diagram of the embodiment of FIG. 3 employing an example of an instruction fetch unit.

FIG. 5 shows one example of the IFU 59 which may be used with the processor core 50 of FIG. 3. In FIG. 5, only a portion of the core 50 is shown. The internal couplings are the same as in FIG. 3.

The IFU 59 has a depth of 2. It is pipelined with a first stage (FU1) 100 and the second stage (FU2) 102. The central latch 101 is coupled between the two stages of IFU 59. The output of FU2 102 is coupled to a queue 103 and a multiplexer 104. The queue 103 in turn is also coupled to the multiplexer 104. If the queue 103 is enabled, an appended bundle issuing from FU2 102 is stored in the queue 103. If the queue 103 is not enabled, the appended bundle issuing from FU2 102 goes through the multiplexer 104 into IFL 54. Thus, as a queue 103 is shown as having two storage locations, two instructions can be processed by the IFU 59 and stored in the queue 103 while the IFL 54 is stalled.

The IFU 59 as shown can take advantage of the decoupled stalling feature of the invention. When ID 55 issues a stall 60 to IFL 54, that stall signal is made available to IFU 59. What IFU 59 does with the stall signal is implementation specific. Accordingly, if ID 55 issues stall signal 60, the signal may be used to enable the queue 103 resulting in appended bundles being stored therein. The IFU 59 may determine based on storage level in the queue 103 or other factors whether to assert stall signal 61. For example, because the IFU 59 stores space for two bundles, it may be able to accept additional bundles from the IPL 53 and begin processing on those bundles. The IFU 59 can then stall the IPL 53 using signal line 61 when its ability to accept additional bundles is exhausted. A longer queue would allow more instructions to be processed before requiring the IFU 59 to stall the IFL 53. In any event, it would be unnecessary to instantly assert stall 61 in the same cycle that stall 60 is asserted. This reduces or eliminates the critical time path previously associated with such stalls and allows the possibility of greater efficiency. Greater efficiency is achieved when allowing the IFU and IP to continue processing reducing later idle time in the ID because, e.g., a fetch from main memory was begun or even completed during the stall. For example, if we assume a twenty cycle stall in the ID 55 and that the instruction of the next bundle issued to the IFU 59 would be fetched from memory 10, if the IFU 59 accepts that next bundle before stalling the IPL 33, significant processing can be performed to retrieve that next needed instruction in the memory during the stall.

FIG. 6 shows an example of instruction flow through the pipeline of the embodiment shown in FIG. 5. In the first cycle, a first instruction, I1 is issued by the IP. In cycle 2, I1 resides in the IPL and is latched into FU1. In cycle 3, I1 resides in central latch and operated on an issued by FU2. In cycle 4, I1 resides in the IFL and I1 is operated on by the ID. FIG. 6 presumes a stall asserted in cycle 4 by the ID. Thus, I2 would follow the same path as I1 one cycle behind, but I2 is placed in the queue in cycle 5 rather than the IFL. Similarly, I3 is placed in the queue in cycle 6 and exhausts the available storage space. The IFU stalls IP in cycle 7, even though the ID stall is released in cycle 6. Thus, in cycle 7, I2 leaves the queue to the IFL and ID. The stall of the IP continues in cycle 8, thereby allowing the queue to empty in subsequent cycles. Other pipe flows are, of course, possible and considered within the scope and contemplation of the invention.

Because the stalls are decoupled, a stall by the ID in any of cycles 1–3 would have no effect on the flow of instructions shown. Moreover, if, for example, I3 is required to be fetched from external memory, a stall of the IP might be initiated in T4, T5 independent of the stall initiated by the ID. However, the IFU will continue to process the fetch, thus depending on the length of the stall in the ID, a valid instruction may be retrieved before (or a shorter time after) the ID becomes available (as mentioned above).

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A processor core comprising:
a first pipe stage which transmits a first bundle across a processor core boundary to an external pipe stage in a first time frame, the first bundle including a plurality of control signals and an instruction address; and
a second pipe stage which receives an appended bundle back across the processor core boundary from the external pipe stage in a second time frame, the appended bundle including the first bundle and an instruction corresponding to the pointer.

2. The processor core of claim 1 further comprising:
a first latch coupled to the first pipe stage, the first latch for latching said first bundle to the external pipe stage and wherein the first latch is not responsive to a stall signal from the second pipe stage; and
a second latch coupled to the second pipe stage for latching the appended bundle into the second pipe stage, the second latch responsive to the stall signal from the second pipe stage.

3. The processor core of claim 2 wherein the second pipe stage transmits a stall signal in a same time frame to the second latch when the second pipe stage cannot accept a next appended bundle in a next time frame.

4. The processor core of claim 3 wherein the stall signal is transmitted to the external pipe stage and the external pipe stage issues a corresponding stall signal to the first pipe stage in one of the same time frame, a subsequent time frame and never.

5. The processor core of claim 4 wherein the stall signal is transmitted to the external pipe stage in the cycle in which the second latch is stalled; and wherein in response to the stall signal, the external pipe stage transmits:
an independent stall signal to the first latch if the external pipe stage cannot accept an additional bundle in the cycle;
transmits the independent stall signal in a subsequent cycle if the external unit becomes unable to accept a new bundle in the subsequent cycle;
does not transmit the independent stall request if no back log exists in the external pipe stage as a result of the stall of the second latch.

6. The processor core of claim 1 wherein the first pipe stage is an instruction pointer generation unit, the second pipe stage is an instruction decode unit, and the external pipe stage is an instruction fetch unit.

7. The processor core of claim 1 wherein the plurality of control signals includes a restart signal, the restart signal asserted in a first bundle of a new branch path.

8. A method of supporting an arbitrary depth instruction fetch unit with a single processor core comprising the steps of:
providing a processor core in which a first pipe stage and a third pipe stage are not coupled together;
bundling an instruction address and pipeline control information from the first pipe stage to form a bundle;
transmitting the bundle across a core boundary to the instruction fetch unit in a first time frame;
appending the bundle in the instruction fetch unit to include an instruction; and
forwarding the appended bundle back across the core boundary to the third pipe stage in a subsequent time frame.

9. The method of claim 8 wherein a stall of the third pipe stage does not directly initiate a stall of the first pipe stage.

10. The method of claim 9 wherein the instruction fetch unit disposed outside the core determines whether to stall the first pipe stage.

11. A pipelined processor system comprising:
a processor core having a plurality of internal pipe stages;
an external pipe stage coupled across a processor core boundary to a first internal pipe stage and a second internal pipe stage; and a memory coupled to the external pipe stage; and wherein the first internal pipe stage generates an instruction pointer and the second internal pipe stage decodes a fetched instruction.

12. The system of claim 11 wherein the first internal pipe stage is isolated from the second internal pipe stage within the core such that a stall issued by the second internal pipe stage does not stall the first internal pipe stage.

13. The system of claim 11 wherein the first internal pipe stage transmits a first bundle including an instruction address and a plurality of pipeline control signals to the external pipe stage in a first time frame; and wherein the external pipe stage transmits a second bundle including the first bundle and an instruction to the second internal pipe stage in a second time frame.

14. The system of claim 13 wherein an interval between the first time frame and the second time frame is independent of a time allotted the internal stages to perform a required operation.

* * * * *

UNITED STATES PATENT AND TRADEMARK OFFICE
CERTIFICATE OF CORRECTION

PATENT NO.   : 5,889,975
DATED        : March 30, 1999
INVENTOR(S)  : Meyer et al.

It is certified that error appears in the above-identified patent and that said Letters Patent is hereby corrected as shown below:

Column 1,
Line 34, delete "tables" and insert -- takes --.

Column 4,
Line 9, delete "IF" and insert -- IFU --.

Column 5,
Line 44, delete "13" and insert -- 13 --.

Signed and Sealed this

Eleventh Day of December, 2001

*Attest:*

*Attesting Officer*

NICHOLAS P. GODICI
*Acting Director of the United States Patent and Trademark Office*